United States Patent [19]

Araki et al.

[11] Patent Number: 5,925,705
[45] Date of Patent: Jul. 20, 1999

[54] AQUEOUS DISPERSION OF VINYLIDENE FLUORIDE POLYMER AND PREPARATION PROCESS THEREOF

[75] Inventors: Takayuki Araki; Nobuhiko Tsuda; Masahiro Kondo, all of Settsu, Japan

[73] Assignee: Daikin Industries, Ltd., Osaka, Japan

[21] Appl. No.: 08/612,865

[22] PCT Filed: Sep. 16, 1994

[86] PCT No.: PCT/JP94/01531

§ 371 Date: Mar. 13, 1996

§ 102(e) Date: Mar. 13, 1996

[87] PCT Pub. No.: WO95/08598

PCT Pub. Date: Mar. 30, 1995

[30] Foreign Application Priority Data

Sep. 20, 1993 [JP] Japan .................................. 5/233858

[51] Int. Cl.⁶ ............................ C08K 5/02; C08K 5/06; C08K 5/10; C08F 114/22
[52] U.S. Cl. ...................... 524/462; 524/457; 524/773; 524/777; 524/795; 524/378; 524/317; 526/250; 526/255; 526/343
[58] Field of Search .................................. 524/319, 457, 524/462, 773, 777, 795, 366, 378, 317; 526/250, 255, 343

[56] References Cited

U.S. PATENT DOCUMENTS

| | | | |
|---|---|---|---|
| 3,708,463 | 1/1973 | Stallings | 524/777 |
| 3,857,827 | 12/1974 | Dohany . | |
| 4,025,709 | 5/1977 | Blaise et al. | 526/255 |
| 4,076,929 | 2/1978 | Dohany | 526/255 |
| 4,360,652 | 11/1982 | Dohany | 526/255 |

FOREIGN PATENT DOCUMENTS

| | | |
|---|---|---|
| 1200139 | 12/1959 | France . |
| 57-40866 | 8/1982 | Japan . |
| 58-34814 | 1/1983 | Japan . |
| 61-52842 | 11/1986 | Japan . |
| 63-8406 | 1/1988 | Japan . |
| 2-222439 | 9/1990 | Japan . |

OTHER PUBLICATIONS

International Search Report in PCT/JP94/01531 mailed Dec. 20, 1994.
Supplementary European Search Report in EP 94 92 7057 mailed Jul. 03, 1997 (completed Apr. 29, 1997).

*Primary Examiner*—Peter A. Szekely
*Attorney, Agent, or Firm*—Varndell Legal Group

[57] ABSTRACT

Aqueous dispersion of a vinylidene fluoride (VdF) polymer which comprises a VdF polymer having a particle size of not more than 200 nm and contains 30 to 50% by weight of solids and not more than 1% by weight of a fluorine-containing surfactant on the basis of water. This aqueous dispersion is prepared by emulsion-polymerizing VdF monomer or a monomer mixture containing VdF under coexistence of not more than 1% by weight of the fluorine-containing surfactant and 0.001 to 0.1% by weight of a nonionic non-fluorine-containing surfactant on the basis of water, and is suitably used for paints.

4 Claims, No Drawings

AQUEOUS DISPERSION OF VINYLIDENE FLUORIDE POLYMER AND PREPARATION PROCESS THEREOF

TECHNICAL FIELD

The present invention relates to an aqueous dispersion of a fluorine-containing polymer usable for paints. More specifically the present invention relates to an aqueous dispersion of a vinylidene fluoride (VdF) type polymer, which comprises a VdF polymer having a particle size of not more than 200 nm and contains 30 to 50% by weight of solids, and a process for preparation thereof.

BACKGROUND ART

Fluorine-containing paints are used as weather resistive paints for exterior and interior coating of medium- or low-storied buildings, and various techniques have been developed for preparation of the fluorine-containing paints. Though many of the fluorine-containing paints are in the form of organic solvent dispersions, there are problems in the use of organic solvents from safety and environmental protection points of view, and ones of aqueous dispersion type are preferable. As the methods of preparing an aqueous dispersion of a fluorine-containing polymer, there are known the methods mentioned below.

For example, JP-B-28669/1974 discloses that when vinyl fluoride is suspension-polymerized in preparation of paints, a nonionic surfactant is added in an amount of 0.05 to 5% by weight on the basis of the monomer to increase yield, to prevent deposition of the polymer onto an inside wall of a polymerization tank and to control particle size of the polymer.

Also JP-A-123646/1986 discloses that in preparing a fluorine-containing copolymer in an aqueous medium, a stable aqueous emulsion can be obtained by adding a dispersion stabilizing agent after polymerization of the fluorine-containing copolymer, but before or during the condensation process of the aqueous dispersion Further JP-B-55441/1992 discloses that in preparing an aqueous fluorine-containing polymer dispersion for aqueous paints, 0.05 to 5.0% by weight of surfactants of various kinds including a nonionic surfactant is added when the seed-polymerization of a monomer having ethylenically unsaturated bond is carried out.

Also JP-A-225550/1990 discloses that a mixture of a fluorine-containing type surfactant and a nonionic type surfactant is used when copolymerizing a fluorine-containing olefin and a hydrophilic group-containing non-fluorine-containing olefin.

Also Koubunshi Ronbun Shu, Vol. 36, No. 11 (1979) discloses at pages 729 to 737 that when a large amount of surfactants of various kinds is used in emulsion polymerization, particles of a polymer latex become smaller, and also that by mixing an anionic surfactant and a nonanionic surfactant in polymerization of an acrylic monomer, there can be obtained the same effect as in case of adding an anionic surfactant solely.

However the technique in JP-B-28669/1974 does not relate to emulsion polymerization, but relates to suspension polymerization without using a fluorine-containing surfactant, and intends to obtain a particle size larger than that of the present invention. The particle size described in Example of this patent publication is as large as 3.4 to 4.5 μm.

Also JP-A-123646/1986 discloses that a polymer latex having a concentration as high as not less than 30% by weight is obtained by using a fluorine-containing emulsifying agent in polymerization process. However there is no description as to the use of a fluorine-containing surfactant for controlling the particles at a size lower than a certain size. In addition, the invention is characterized by the use of a specific non-fluorine-containing dispersion stabilizing agent, and its amount to be used is as much as 2 to 8% by weight on the basis of a solid content. Usually the particle size of a latex tends to increase together with a polymer concentration, and when the fluorine-containing surfactant is used solely and if its amount is not more than 1% by weight, there cannot be obtained a particle size of not more than 200 nm if the solid content is assumed to be 30 to 50% by weight. Also there is no description as to controlling of the particle size of the aqueous latex. It is also described that if the nonionic surfactant is added in preparing an aqueous emulsion, there is an adverse effect such as coloring.

Further in the technique disclosed in JP-B-55441/1992, no surfactant is used in the polymerization of a fluorine-containing olefin, and also there is no disclosure as to the use of a fluorine-containing surfactant as the surfactant to be used in the seed-polymerization.

Also the technique specifically disclosed in JP-A-225550/1990 is one wherein chlorotrifluoroethylene is used as a fluoroolefin unit and the amount of the nonionic surfactant used is as relatively much as 3% by weight on the basis of water. However in copolymerization of VdF, there has been generally known that there occur problems such that when the nonionic surfactant is added, the reaction rate is lowered remarkably and the molecular weight is not increased.

Also in the techniques disclosed in the above-mentioned Koubunshi Ronbun Shu, the use of the surfactant in a large amount causes an adverse effect on water resistance when used for paints.

The present invention has been made to solve the above-mentioned problems, and it is an object of the present invention to provide an aqueous dispersion of a fluorine-containing polymer, which comprises a VdF polymer having a particle size as small as not more than 200 nm and contains solids in an amount as high as 30 to 50% by weight and a surfactant in an amount as low as not more than 1% by weight on the basis of water, and its preparation process.

DISCLOSURE OF THE INVENTION

The present invention relates to an aqueous dispersion of a VdF polymer, which comprises a VdF polymer having a particle size of not more than 200 nm, has a solid content of 30 to 50% by weight and contains a fluorine-containing surfactant in an amount of not more than 1% by weight on the basis of water.

It is possible in the present invention that in the known emulsion polymerization system, notwithstanding that the solid content is as high as 30 to 50% by weight, the particle size can be decreased to not more than 200 nm by adding a nonionic non-fluorine-containing surfactant in a trace amount of 0.001 to 0.1% by weight on the basis of water in the presence of a small amount of a fluorine-containing surfactant, i.e. not more than 1% by weight, on the basis of water.

BEST MODE FOR CARRYING OUT THE INVENTION

As the VdF polymer in the present invention, there are homopolymer of VdF; a copolymer of VdF monomer and at least one of the other fluorine-containing monomers such as tetrafluoroethylene (TFE), trifluoroethylene (TrFE), chlorotrifluoroethylene (CTFE) and hexafluoropropylene (HFP); a copolymer of VdF, the other fluorine-containing monomer and a monomer having an unsaturated bond which is copolymerizable therewith. The preferable copolymers are, for example, VdF/TFE copolymer, VdF/TFE/HFP copolymer, VdF/TFE/CTFE copolymer, VdF/TFE/TrFE copolymer, VdF/CTFE copolymer, VdF/HFP copolymer, VdF/TFE/HFP/CTFE copolymer, VdF/TFE/perfluorobutenoic acid copolymer, VdF/TFE/maleic acid copolymer and the like. The content of VdF units of these copolymers is preferably not less than 50% by mole, more preferably not less than 70% by mole. The weight average molecular weight ($M_w$) M>wbw of these VdF polymers is from 1,000 to 1,000,000, preferably from 10,000 to 500,000. When lower than 1,000, mechanical properties and weatherability when forming a film tend to be inferior, and when higher than 1,000,000, there are tendencies that the resin does not flow when forming a film, leveling property is lowered and no gloss is exhibited.

The particle size of the VdF polymer is not more than 200 nm, preferably from 150 to 100 nm. Since the particle size is as small as not more than 200 nm, the polymer is excellent in stability against sedimentation and dispersing property of additives is excellent. When the particle size is larger than 200 nm, there occurs sedimentation and coagulation of the particles during storage of the dispersion and the dispersing property of the additives is poor. Also there is a tendency that gloss of the formed film is difficult to be obtained.

The fluorine-containing surfactant used in the present invention is one or a mixture of compounds containing fluorine atoms in their structures and having surface activity. For example, there are an acid represented by $X(CF_2)_n COOH$ (n is an integer of 6 to 20, X is F or H), its alkali metal salt, ammonium salt, amine salt or quaternary ammonium salt; an acid represented by $Y(CH_2CF_2)_m COOH$ (m is an integer of 6 to 13, Y is F or Cl), its alkali metal salt, ammonium salt, amine salt or quaternary ammonium salt; or the like. More specifically there are used an ammonium salt of perfluoro(octanoic acid), an ammonium salt of perfluoro (nonanoic acid) or the like. In addition, there can be used known fluorine-containing surfactants.

The amount of the fluorine-containing surfactant to be used is not more than 1.0% by weight on the basis of water, preferably not more than 0.5% by weight, more preferably not more than 0.2% by weight. The lower limit is usually 0.01% by weight. When more than 1.0% by weight, there occurs a phenomenon such as precipitation of the surfactant in the film formed from the aqueous dispersion and also there is a tendency such that water absorption increases to make the dispersion whiten. Thus it is not preferable if the amount of the fluorine-containing surfactant is more than 1.0% by weight.

The solid content of the aqueous dispersion of the present invention is from 30 to 50% by weight, preferably from 35 to 45% by weight. When less than 30% by weight, there is a tendency such that when forming a film, viscosity adjustment is difficult and leveling property is lowered. When more than 50%, stability of the dispersion becomes worse, and deposition and coagulation tend to occur in polymerization process.

Water to be used for an aqueous dispersion of the present invention is preferably a deionized water.

The aqueous dispersion of the VdF polymer of the present invention can be prepared, for example, by emulsion-polymerizing VdF monomer or a monomer mixture containing VdF under coexistence of the above-mentioned fluorine-containing surfactant in an amount of not more than 1% by weight on the basis of water and a trace amount of the nonionic non-fluorine-containing surfactant.

In order to prepare the aqueous dispersion which comprises the VdF polymer having a particle size of not more than 200 nm and contains solids in an amount of 30 to 50% by weight, it is usually necessary to use a large amount of a fluorine-containing surfactant. However according to the preparation process of the present invention, it is possible to decrease the amount of the fluorine-containing surfactant to a small amount of not more than 1% by weight by adding a trace amount of the nonionic non-fluorine-containing surfactant. Namely, a small particle size of not more than 200 nm can be attained by adding the nonionic non-fluorine-containing surfactant.

As the nonionic non-fluorine-containing surfactant, there are polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters which have an HLB value of 10 to 18. More particularly there are polyoxyethylene lauryl ether (EO: 5 to 20. EO stands for an ethylene oxide unit.), polyethylene glycol monostearate (EO: 10 to 55) and polyethylene glycol monooleate (EO: 6 to 10).

The amount of the nonionic non-fluorine-containing surfactant used in the present invention is from 0.001 to 0.1% by weight on the basis of water, preferably from 0.01 to 0.05% by weight. When more than 0.1% by weight, it is not practicable because the rate of reaction is lowered because of chain transfer reaction and the reaction is stopped. Also when less than 0.001% by weight, there is almost no effect of making the particle size fine.

The emulsion having a relatively high concentration can also be obtained by polymerizing, in an organic solvent, a monomer mixture containing an ethylenically unsaturated monomer having an ionic group or polyalkylene oxide group, then adding water and distilling off the organic solvent. For example, an emulsion can be obtained by solution-polymerizing, in ethyl acetate, a mixture of VdF, TFE and perfluorobutenoic acid ($CF_2=CF-CF_2COOH$), adding aqueous ammonia solution to neutralize, then pouring dropwise into ion-exchanged water containing a fluorine-containing surfactant with stirring to disperse homogeneously, and distilling off ethyl acetate by using an evaporator.

In order to polymerize VdF monomer, an initiator is usually used. As the initiator, particularly there is no restriction if it serves to generate radicals usable for free radical reaction in an aqueous medium at a temperature between 20° C. and 90° C. Usually as the water soluble initiator, there are potassium salt and ammonium salt of persulfuric acid, and hydrogen peroxide; and as the oil soluble initiator, there are diisopropyl peroxydicarbonate (IPP), azobisisobutyronitrile (AIBN) and the like. The amount of the initiator to be added is from 0.005 to 1.0% by weight on the basis of water, preferably from 0.01 to 0.5% by weight. When less than 0.005% by weight, the polymerization rate tends to be lowered extremely, and when more than 1.0% by weight, there is a tendency such that a concentration of an electrolyte is increased and thus the particle size is increased.

In preparing the aqueous dispersion of the VdF polymer of the present invention, the polymerization temperature is from 20° to 120° C., preferably from 30° to 70° C. When lower than 20° C., in general there is a tendency such that stability of the formed latex is lowered, and when higher than 120° C., the polymerization rate tends to be decreased due to chain transfer reaction Polymerization is usually carried out by heating for 5 to 100 hours under a pressure of 1.0 to 50 kgf/cm$^2$ (gauge pressure) though it depends on kind of the polymer.

The aqueous dispersion of the VdF polymer of the present invention can be used as water base paints for coating by blending additives such as pigments, thickeners, dispersing agents, defoaming agents, antifreezing agents and film forming auxiliaries or in addition thereto by combining with other high molecular compounds.

The present invention is explained further in detail based on examples, but is not limited thereto.

EXAMPLE 1

A one-liter pressure resistive reactor equipped with a stirrer was charged with 500 ml of deionized water, 0.5 g of a fluorine-containing surfactant, i.e. an ammonium salt of perfluoro(octanoic acid) (PFOA) and 0.05 g of a nonionic non-fluorine-containing surfactant, i.e. polyoxyethylene lauryl ether (MYS40 available from Nikko Chemicals Co., Ltd.), and steps of introduction of pressurized nitrogen gas and deaeration were repeated to remove the dissolved air. The inside pressure of the reactor was then raised to 20 kgf/cm$^2$ (gauge pressure) at 60° C. by using VdF. Then 0.2 g of an initiator, i.e. ammonium persulfate was added, VdF was continuously supplied to maintain the inside pressure of the reactor constant at 20 kgf/cm$^2$ (gauge pressure), and the reaction was carried out for 20 hours. Afterwards the reaction system was rendered to normal temperature and normal pressure, and thereby the reaction was terminated. The intrinsic viscosity [η] of the obtained polymer comprising VdF solely, which was measured in a dimethylfuran (DMF) solvent at 35° C. was 0.63. The measured characteristic values of the obtained aqueous dispersion are shown in TABLE 1.

In TABLE 1, the solid content is represented in percentage of the weight of the aqueous dispersion after dried at 150° C. for one hour in a vacuum dryer to its weight before drying. The particle size is an average size obtained by measuring the particle sizes with a laser beam scattering particle size analyzer (ELS-3000 available from Otsuka Denshi Kogyo Kabushiki Kaisha). The stability against sedimentation was evaluated as follows by allowing an aqueous dispersion to be tested to stand at 25° C. for 60 days.

○: There is no change in dispersed state with naked eyes.

Δ: The dispersion is separated into a transparent water phase and a dispersed particle phase and it is possible to re-disperse by shaking.

×: The dispersion is separated into a transparent water phase and a dispersed particle phase, and it is impossible to re-disperse by shaking.

EXAMPLE 2

A one-liter pressure resistive reactor equipped with a stirrer was charged with 500 ml of deionized water, 0.5 g of an ammonium salt of perfluoro(octanoic acid) and 0.05 g of polyoxyethylene lauryl ether, and steps of introduction of pressurized nitrogen gas and deaeration were repeated to remove the dissolved air. The inside pressure of the reactor was then raised to 8 kgf/cm$^2$ (gauge pressure) at 60° C. by using a VdF/TFE monomer mixture (80/20% by mole). Then 0.05 g of ammonium persulfate was added, the above-mentioned monomer mixture was continuously supplied to maintain the inside pressure of the reactor constant at 8 kgf/cm$^2$ (gauge pressure), and the reaction was carried out for 20 hours. Afterwards the reaction system was rendered to normal temperature and normal pressure, and thereby the reaction was terminated. The intrinsic viscosity [η] of the obtained VdF/TFE copolymer in a methyl ethyl ketone (MEK) solution at 35° C. was 1.43. The measured characteristic values of the obtained aqueous dispersion are shown in TABLE 1.

EXAMPLE 3

A one-liter pressure resistive reactor equipped with a stirrer was charged with 500 ml of deionized water, 0.5 g of an ammonium salt of perfluoro(octanoic acid) and 0.05 g of polyoxyethylene lauryl ether, and steps of introduction of pressurized nitrogen gas and deaeration were repeated to remove the dissolved air. The inside pressure of the reactor was then raised to 8 kgf/cm$^2$ (gauge pressure) at 60° C. by using a VdF/TFE/HFP monomer mixture (72/20/8% by mole). Then 0.2 g of ammonium persulfate was added, the above-mentioned monomer mixture was continuously supplied to maintain the inside pressure of the reactor constant at 8 kgf/cm$^2$ (gauge pressure), and the reaction was carried out for 38 hours. Afterwards the reaction system was rendered to normal temperature and normal pressure, and thereby the reaction was terminated. The intrinsic viscosity [η] of the obtained VdF/TFE/HFP copolymer in an MEK solvent at 35° C. was 1.08. The measured characteristic values of the obtained aqueous dispersion are shown in TABLE 1.

EXAMPLE 4

A one-liter pressure resistive reactor equipped with a stirrer was charged with 500 mg of deionized water, 0.5 g of an ammonium salt of perfluoro(octanoic acid) and 0.05 g of polyoxyethylene lauryl ether, and steps of introduction of pressurized nitrogen gas and deaeration were repeated to remove the dissolved air. The inside pressure of the reactor was raised to 8 kgf/cm$^2$ (gauge pressure) at 60° C. by using a VdF/TFE/CTFE monomer mixture (75/15/10% by mole). Then 0.2 g of ammonium persulfate was added, the above-mentioned monomer mixture was continuously supplied to maintain the inside pressure of the reactor constant at 8 kgf/cm$^2$ (gauge pressure), and the reaction was carried out for 40 hours. Afterwards the reaction system was rendered to normal temperature and normal pressure, and thereby the reaction was terminated. The intrinsic viscosity [η] of the obtained VdF/TFE/CTFE copolymer in an MEK solvent at 35° C. was 1.20. The measured characteristic values of the obtained aqueous dispersion are shown in TABLE 1.

Comparative Examples 1 to 4

Aqueous dispersions of the VdF polymer were prepared in the same manner as in EXAMPLES 1 to 4 except that the nonionic non-fluorine-containing surfactant was not used and the amount of the fluorine-containing surfactant was changed as shown in TABLE 1. The measured characteristic values of the obtained aqueous dispersions are shown in TABLE 1.

Comparative Example 5

An aqueous dispersion of the VdF polymer was prepared in the same manner as in EXAMPLE 3 except that CTFE was used instead of HFP and the amount of the fluorine-containing surfactant was changed as shown in TABLE 1. The measured characteristic values of the obtained aqueous dispersion are shown in TABLE 1. As shown in TABLE 1, these characteristics were preferable, but there was found precipitation of the fluorine-containing surfactant at drying the formed file

TABLE 1

|  |  | Ex. 1 | Ex. 2 | Ex. 3 | Ex. 4 | Com. Ex. 1 | Com. Ex. 2 | Com. Ex. 3 | Com. Ex. 4 | Com. Ex. 5 |
|---|---|---|---|---|---|---|---|---|---|---|
| Monomer (% by mole) | VdF*1 | 100 | 80 | 72 | 75 | 100 | 80 | 72 | 75 | 72 |
|  | TFE*2 | — | 20 | 20 | 15 | — | 20 | 20 | 15 | 20 |
|  | HFP*3 | — | — | 8 | — | — | — | 8 | — | — |
|  | CTFE*4 | — | — | — | 10 | — | — | — | 10 | — |
| Surfactant (% by weight) | Fluorine-containing type | PFOA*5 (0.1) | PFOA (0.1) | PFOA (0.1) | PFOA (0.1) | PFOA (1.0) | PFOA (1.0) | PFOA (1.0) | PFOA (0.1) | PFOA (2.0) |
|  | Nonionic non-fluorine-containing type | MYS40*6 (0.01) | MYS40 (0.01) | MYS40 (0.01) | MYS40 (0.01) | — | — | — | — | — |
| Aqueous dispersion | Solid content (% by weight) | 3.1 | 32.1 | 33.4 | 42.0 | 18.5 | 24.6 | 32.0 | 34.6 | 31.5 |
|  | Particle size (nm) | 180.5 | 167.3 | 125.9 | 165.0 | 231.7 | 269.2 | 234.5 | 320.1 | 196.3 |
|  | Stability against sedimentation | ○ | ○ | ○ | ○ | Δ | X | X | X | ○ |

*1Vinylidene fluoride
*2Tetrafluoroethylene
*3Hexafluoroethylene
*4Chlorotrifluoroethylene
*5Ammonium salt of perfluoro(octanoic acid)
*6Polyoxyethylene lauryl ether available from Nikko Chemicals Co., Ltd.

INDUSTRIAL APPLICABILITY

The aqueous dispersion of the VdF polymer of the present invention is excellent in stability against sedimentation notwithstanding a small amount of a surfactant and can provide coating films excellent in water resistance and leveling property. According to the preparation process of the present invention, the above-mentioned aqueous dispersion can be prepared easily by using a trace amount of a nonionic non-fluorine-containing surfactant even if the amount of a fluorine-containing surfactant is decreased greatly.

We claim:

1. An aqueous dispersion of a vinylidene fluoride polymer, which comprises a vinylidene fluoride polymer having an average particle size of not more than 200 nm, wherein a solid content is from 30 to 50% by weight a content of a fluorine-containing surfactant is not more than 1% by weight on the basis of water, and a content of a nonionic non-fluorine-containing surfactant is from 0.001 to 0.1% by weight on the basis of water.

2. A process for preparing the aqueous dispersion of the vinylidene fluoride polymer of claim 1, wherein vinylidene fluoride monomer or a monomer mixture containing vinylidene fluoride is emulsion-polymerized under coexistence of not more than 1% by weight of a fluorine-containing surfactant on the basis of water and 0.001 to 0.1% by weight of a nonionic non-fluorine-containing surfactant on the basis of water.

3. The aqueous dispersion of a vinylidene fluoride polymer of claim 1, wherein the nonionic non-fluorine-containing surfactant is a polyoxyethylene alkyl ether or a polyoxyethylene alkyl ester.

4. The process of claim 2, wherein nonionic non-fluorine-containing surfactant is a polyoxyethylene alkyl ether or a polyoxyethylene alkyl ester.

* * * * *